(12) United States Patent
Buschmann et al.

(10) Patent No.: US 7,397,856 B2
(45) Date of Patent: Jul. 8, 2008

(54) METHOD AND APPARATUS FOR STORING AND PROCESSING PICTURE INFORMATION OF TEMPORALLY SUCCESSIVE PICTURES

(75) Inventors: Ralf Buschmann, Geretsried (DE); Gero Bäse, München (DE); Andreas Hutter, München (DE); Robert Kutka, Geltendorf (DE); Norbert Oertel, München (DE); Juergen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 728 days.

(21) Appl. No.: 10/257,626

(22) PCT Filed: Apr. 9, 2001

(86) PCT No.: PCT/DE01/01393

§ 371 (c)(1),
(2), (4) Date: Oct. 15, 2002

(87) PCT Pub. No.: WO01/80569

PCT Pub. Date: Oct. 25, 2001

(65) Prior Publication Data

US 2003/0059119 A1    Mar. 27, 2003

(30) Foreign Application Priority Data

Apr. 14, 2000    (DE)    ............................... 100 18 662

(51) Int. Cl.
*H04N 7/12*    (2006.01)
(52) U.S. Cl. .............. 375/240.12; 375/240; 375/240.01
(58) Field of Classification Search ................ 375/240, 375/240.01, 240.12, 240.16, 240.14; 348/700
See application file for complete search history.

(56) References Cited

U.S. PATENT DOCUMENTS 4,636,862 A    1/1987    Hatori et al.

(Continued)

FOREIGN PATENT DOCUMENTS

EP    0 606 675    7/1994

(Continued)

OTHER PUBLICATIONS

Itu-T H.263 (Feb. 1998) Series H: Audiovisual and Multimedia Systems Infrastructure of audiovisual services—Coding of moving video.

(Continued)

*Primary Examiner*—Allen Wong
(74) *Attorney, Agent, or Firm*—Bell Boyd & Lloyd LLP

(57) ABSTRACT

A method and apparatus are provided for storing and processing picture information of temporally successive pictures wherein in each case at least one picture area is selected from each temporally preceding picture taking into account, the picture information determined from each selected picture area is stored with an assignment information item, which enables an assignment of the respective picture area and thus also of the picture information of the respective picture area to the corresponding picture and to the position of the picture area within the corresponding picture, at least one mixed picture is formed from the picture information of the respectively stored, selected picture areas, taking the account of the assignment information, and the mixed picture is used in the context of a motion estimation, a motion compensation or an error masking for an image.

14 Claims, 3 Drawing Sheets

U.S. PATENT DOCUMENTS 5,485,279 A * 1/1996 Yonemitsu et al. ..... 375/240.14
5,561,477 A * 10/1996 Polit .......................... 348/700
5,802,211 A 9/1998 King

FOREIGN PATENT DOCUMENTS

| EP | 0 849 950 | 6/1998 |
| WO | WO 98/29834 | 7/1998 |
| WO | WO 99/52077 | 10/1999 |

OTHER PUBLICATIONS

Dixon et al,; A New Object Motion Estimation Technique for Video Images, Based on a Genetic Algorithm, pp. 886-895.

* cited by examiner

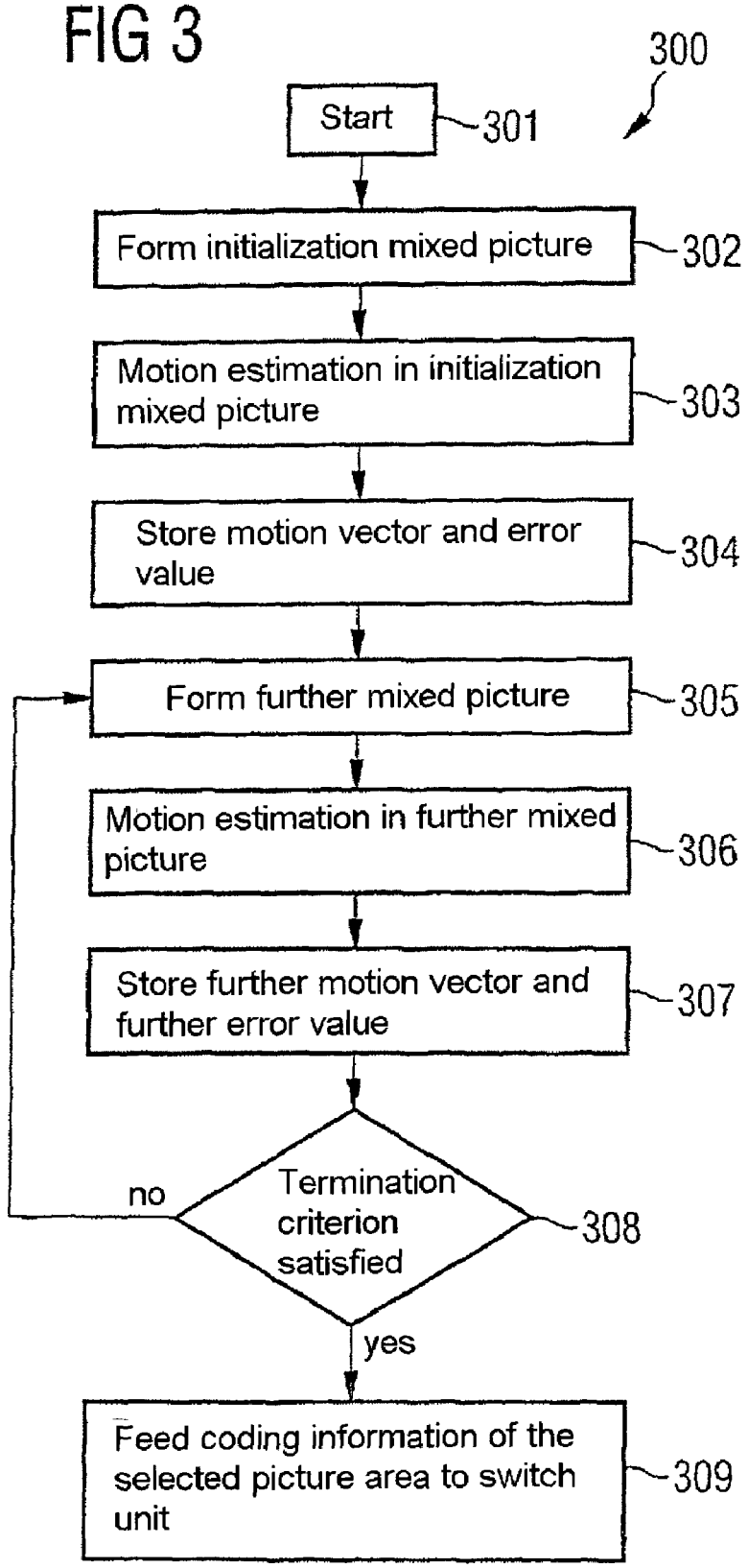

METHOD AND APPARATUS FOR STORING AND PROCESSING PICTURE INFORMATION OF TEMPORALLY SUCCESSIVE PICTURES

BACKGROUND OF THE INVENTION

Such a method and such a device are disclosed in [1]. This known procedure utilizes a motion estimation for picture information from picture areas of a number of temporally preceding pictures. A number of predecessor pictures are used for the motion estimation in order to make available a larger selection of picture areas, thereby improving the motion estimation and, associated with this, a motion compensation or an error concealment.

This can be explained, for example, by the fact that, in the case of background becoming free in a picture, between the picture that is to be coded or generally to be processed and its directly temporally preceding picture, a motion estimation is highly erroneous when only these two pictures are taken into account. However, if a number of predecessor pictures are taken into account in the context of the motion estimation or the error concealment, then it is possible to replicate these picture areas of the background becoming free from earlier, temporally preceding pictures.

Usually, in the case of so-called predictive coding methods, that is to say in the case of coding methods in which a so-called motion estimation is carried out, the present picture information is estimated from already transmitted picture information from picture areas and only a so-called estimation error produced as a result of the motion estimation is communicated. The more accurate this motion estimation, the more effectively the sequence of temporally successive pictures (also referred to as picture sequence hereinafter) can be compressed. To date, it has been customary to apply the motion estimation only to the directly temporally preceding picture. If objects move against a background of the picture, then the background becoming free cannot be predicted from the directly temporally preceding predecessor picture; rather, it must be coded completely anew. As a result, the efficiency of the picture compression decreases and the required data rate for transmission of the picture sequence with constant quality increases.

In the case of the procedure disclosed in [1], all of the predecessor pictures which are taken into account over a number of temporally preceding pictures in the context of the motion estimation are stored in their entirety. This leads to a considerable memory space requirement, particularly in applications in which only a relatively small memory space is available, for example in video telephony. In the case of this known procedure, a multiple of the memory space that is usually available for picture coding is required to store the necessary picture information of the multiplicity of temporally preceding pictures.

Consequently, the present invention is based on the problem of storing and processing picture information of temporally successive pictures, the quality of a motion estimation or an error concealment being similar to that as in the case of the procedure disclosed in [1], but the memory space requirement for storing the multiplicity of temporally preceding pictures being reduced.

SUMMARY OF THE INVENTION

In the case of a method for storing and processing picture information of temporally successive pictures, according to the present invention, in each case at least one picture area is selected from each temporally preceding picture taken into account. The picture information determined from each selected picture area is stored with an assignment information item, which enables an assignment of the respective picture area and, thus, also of the picture information of the respective picture area to the corresponding picture and to the position of the picture area within the corresponding picture. At least one mixed picture is formed from the picture information of the respectively stored, selected picture areas, taking account of the assignment information. The mixed picture is used in the context of a motion estimation or a motion compensation or an error concealment for a picture.

An inventive device for storing and processing picture information of temporally successive pictures has a processor which is set up in such a way that the following steps can be carried out:

in each case, at least one picture area is selected from each temporally preceding picture taken into account, picture information from each selected picture area is stored with an assignment information item, which enables an assignment of the respective picture area to the corresponding picture and to the position of the picture area within the picture, at least one mixed picture is formed from the picture information from the stored selected picture areas, with the respective assignment information being taken into account, the mixed picture is used in the context of a motion estimation, a motion compensation or an error concealment for a picture.

In a computer-readable storage medium of the present invention, a computer program for storing and processing picture information of temporally successive pictures is stored, which, if it is executed by a processor, has the following method steps:

in each case, at least one picture area is selected from each temporally preceding picture taken into account, picture information from each selected picture area is stored with an assignment information item, which enables an assignment of the respective picture area to the corresponding picture and to the position of the picture area within the picture, at least one mixed picture is formed from the picture information from the stored selected picture areas, with the respective assignment information being taken into account, the mixed picture is used in the context of a motion estimation, a motion compensation or an error concealment for a picture.

Moreover, an inventive computer program element for storing and processing picture information of temporally successive pictures is disclosed which has the following method steps, if it is executed by a processor:

in each case, at least one picture area is selected from each temporally preceding picture taken into account, picture information from each selected picture area is stored with an assignment information item, which enables an assignment of the respective picture area to the corresponding picture and to the position of the picture area within the picture, at least one mixed picture is formed from the picture information from the stored selected picture areas, with the respective assignment information being taken into account, the mixed picture is used in the context of a motion estimation, a motion compensation or an error concealment for a picture.

Since the invention makes it possible no longer to store the temporally preceding pictures in their entirety, but rather to select and store picture areas of temporally preceding pictures, a considerable reduction of the necessary memory space requirement is achieved.

Nevertheless, the motion estimation quality that can be achieved remains essentially identical to the quality which can be achieved with the method disclosed in [1].

Clearly, the present invention can be seen in the fact that relevant areas for the motion estimation of temporally preceding pictures that are taken into account are preferably stored, instead of storing the entire picture information of temporally preceding pictures for the motion estimation over a multiplicity of temporally preceding pictures.

The invention can be embodied both by a computer program, that is to say in software, and by a special electronic circuit in hardware.

In one embodiment of the present invention, it is provided that a picture area is selected when the picture information in the corresponding picture area is sufficiently suitable with regard to a predetermined criterion for the motion estimation of two temporally successive pictures; that is to say, when the picture information satisfies a predetermined criterion.

In a further embodiment of the present invention, it is provided that a number of successive temporally preceding pictures are used in order to select and store picture areas from these pictures.

The picture information can be stored in a ring memory structure, that is to say a memory space of predetermined size can be made available for storing the picture information of temporally preceding pictures and, for the case where the memory area made available has been filled, picture areas, that is to say the picture information of the corresponding picture areas, correspondingly can be overwritten by "more up-to-date" picture information.

This can be done by the picture information which has been stored for the longest time in the memory being overwritten by the more up-to-date picture information that is to be newly stored.

As an alternative, it is possible to replace the picture information which has been selected the least often in the context of the motion estimation, motion compensation or the error concealment, since, from a heuristic standpoint, this picture information is not sufficiently suitable for the motion estimation and, consequently, also need not remain in storage.

This development can ensure a deterministically prescribed memory space requirement which is considerably less than the memory space requirement in the case of the procedure disclosed in [1].

A motion estimation can be carried out on the at least one mixed picture with regard to the picture to be processed.

Furthermore, a number of mixed pictures can be formed from the picture information from picture areas of a number of temporally preceding pictures and, for each mixed picture, a motion estimation can be carried out with regard to the picture.

In accordance with this embodiment, the mixed picture is selected for which the motion estimation yields a best result with regard to a predetermined criterion. The motion vectors are formed for the picture areas of the selected mixed picture, which motion vectors finally can be used in the context of the motion compensation or the error concealment.

The mixed pictures can be formed iteratively for each temporally preceding picture taken into account progressively proceeding from the picture for which further processing is provided.

This can be done by the stored picture information of a respective temporally preceding picture being copied into a mixed picture and the resulting mixed picture being stored. The stored picture information of a respective temporally preceding picture is copied into the mixed picture resulting in the preceding step. The method is continued progressively for each mixed picture to be formed until all the temporally preceding pictures have been taken into account.

The picture area to be selected generally can have any desired form, but the picture object preferably has a predeterminable form or is a macroblock or a picture block.

This development makes it possible to readily insert the method into customary block-based and/or object-based picture coding methods.

The present invention can be used both in the context of video telephony and in digital television or in so-called HDTV. Furthermore, the present invention advantageously can be used in Internet video streaming, in the area of video on demand, in business television, or in Internet television.

It should be pointed out that the present invention can be used in the context of any picture coding method in which a motion estimation is carried out; that is to say, in any predictive picture coding method.

A further refinement provides for the picture information from each selected picture area and/or the associated assignment information to be compressed prior to storage.

Additional features and advantages of the present invention are described in, and will be apparent from, the following Detailed Description of the Invention and the Figures.

BRIEF DESCRIPTION OF THE FIGURES

FIG. 3 shows a flow diagram illustrating the individual method steps of the method in accordance with an exemplary embodiment of the present invention.

DETAILED DESCRIPTION OF THE INVENTION

Figure 2:
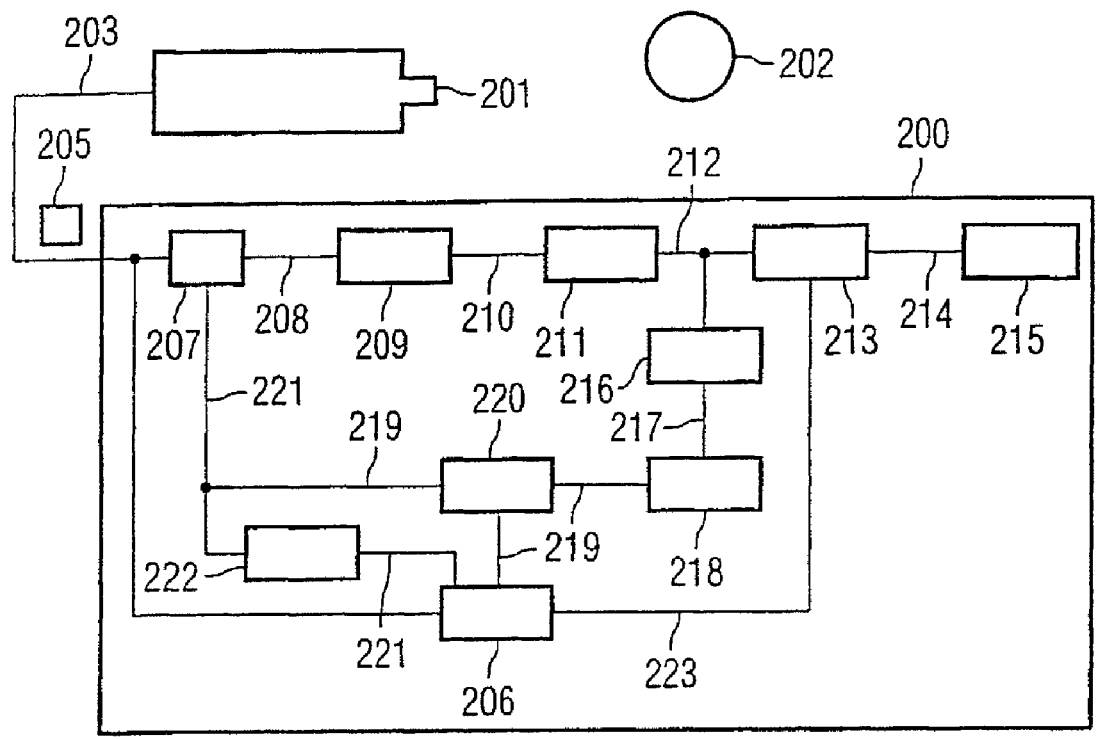
FIG. 2 shows a coding arrangement in accordance with an exemplary embodiment of the present invention.

FIG. 2 shows a coding arrangement 200 with a camera 201, which records pictures of a user 202 of the coding arrangement 200. The camera 201 is connected to a source coder 204 via a line 203. In the source coder 204, the video pictures that have been recorded by the camera and digitized are source-coded in accordance with the procedure described below.

The individual video pictures have pixels which are assigned coding information, for example color information or brightness information. The pixels are grouped into picture blocks 205, which are, in turn, grouped into so-called macroblocks.

Picture blocks 205 of a picture to be coded are fed to the source coder 204. In the source coder 204, the picture blocks 205 are fed to a unit for motion estimation 206 and to a switch unit 207. The switch unit 207 is used to determine, under the control of a control unit (not illustrated), whether a motion estimation is carried out for the picture block and, consequently, a difference picture information item 208 between coding information of the picture block to be coded and a picture block of a temporally preceding picture is to be generated, or whether the complete coding information 208 of the picture block 205 to be coded is to be fed via the switch unit 207 to a transformation unit 209.

In the transformation unit 209, a Discrete Cosine Transform (DCT) is carried out on the coding information to be coded or the difference coding information, thereby forming transform coefficients 210 which are quantized to form quantized transform coefficients 212 in a quantization unit 211.

The quantized transform coefficients 212 are fed to a unit for run length coding 213. The run-length-coded transform coefficients 214 are written to an output buffer 215. The run-length-coded transform coefficients 214 are read from the output buffer 215 and fed, for example, to a channel coding and transmitted to a receiver.

The quantized transform coefficients 212 are furthermore fed in a feedback loop to an inverse quantization unit 216, where they are subjected to inverse quantization to form inverse-quantized transform coefficients 217.

The inverse-quantized transform coefficients 217 are fed to an inverse transformation unit 218, where the inverse-quantized transform coefficients 217 are subjected to an Inverse Discrete Cosine Transform (IDCT), thereby forming inverse-transformed coefficients 219 which are stored in a first memory 220.

In the unit for motion estimation 206, a motion estimation is carried out using the inverse-transformed coefficients 219 stored in the first memory 220.

After motion estimation has been carried out, in accordance with this exemplary embodiment a decision is made as to whether or not a picture block is well suited to a motion estimation.

This is done, as is described below, by analysis of a multiplicity of pictures and checking whether a respective picture block is suitable for a motion estimation; that is to say, can cause a statistically low error value in the context of the motion estimation and can thus statistically ensure a low data rate.

This is the case, for example, for picture blocks which describe a background becoming free, that is to say picture blocks which describe an object which, between temporally successive pictures, varies greatly with regard to its position within the picture sequence. The selected picture blocks, that is to say the picture information of the selected picture blocks, are stored in a second memory 222.

This procedure is explained in more detail below with reference to FIG. 1.

The motion vectors 223 resulting in the context of the motion estimation are fed to the unit for run length coding 213, where they are subjected to run length coding and are processed further.

Figure 1:
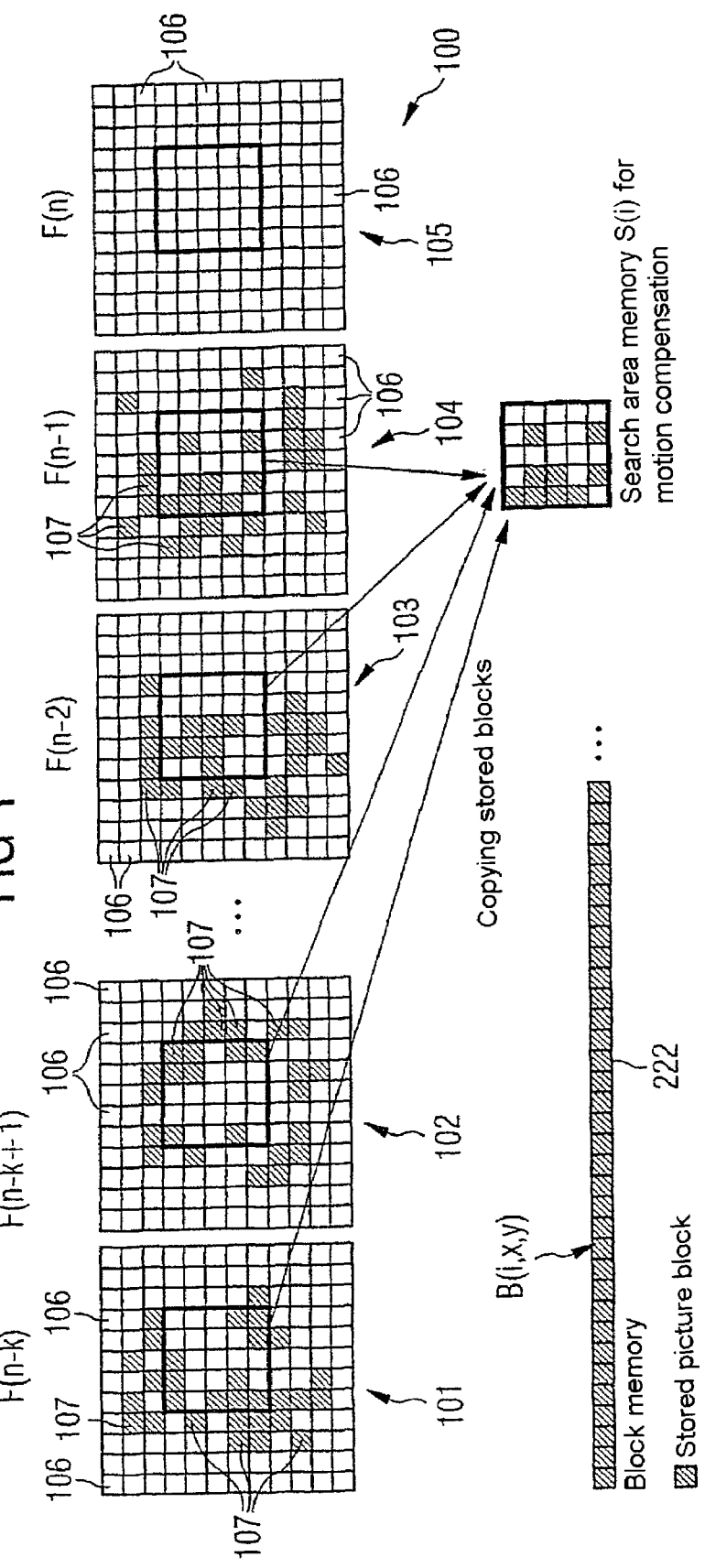
FIG. 1 shows a sketch illustrating the principle of the procedure in accordance with an exemplary embodiment of the present invention.

FIG. 1 shows a sequence 100 of digitized pictures 101, 102, 103, 104, 105. In accordance with this exemplary embodiment, F(n) designates the present picture to be coded, for which a motion estimation is to be carried out. The preceding picture the furthest back in time which is taken into account in the context of the method described below is designated by F(n−k). This means that k temporally preceding pictures are taken into account in the context of the method for motion estimation.

The pictures have picture blocks 106. Selected picture blocks are identified by the reference symbols 107. Coding information of the selected picture blocks 107 are stored in the second memory 222 together with an assignment information item. The assignment information item contains a specification concerning the picture in which the selected picture block is situated, and a coordinate specification which unambiguously describes the position of the selected picture block within the corresponding picture.

The assignment information item is designated by B(i, x, y), where i designates the respective picture in which the selected picture block is situated, x designates an x-coordinate specification which specifies the position with regard to the x-coordinate within the selected picture block within the corresponding temporally preceding picture, and y designates a y-coordinate specification which specifies the position with regard to the y-coordinate within the selected picture block within the corresponding temporally preceding picture.

The second memory 222 has a ring memory structure, as is indicated in FIG. 1.

If the unit for motion estimation 207 carries out a motion estimation, then this is done in the manner illustrated in FIG. 3, within a search area 108.

FIG. 3 shows the individual method steps of the method for motion estimation 300 in accordance with this exemplary embodiment.

The method is started in a first step (step 301).

In a further step, for the search area 108, an initialization mixed picture 109 is formed from coding information of picture blocks exclusively of the temporally directly preceding picture (step 302). This information is available in its entirety, thereby ensuring that coding information is available in the entire search area for the motion estimation.

For the corresponding picture block to be coded, a motion estimation is carried out (step 303) within the search area 108 in the initialization mixed picture 109, thereby forming a first motion vector. Moreover, the result of the motion estimation is an error value specifying the extent to which the coding information items in the selected area within the search area in the initialization mixed picture 302 differ from that of the coding information in the picture block to be coded. This can be done, for example, by forming the sum of the square differences of the individual coding information items of the pixels taken into account.

The error value and the associated motion vector are stored (step 304).

In a further step (step 305), a second mixed picture 109 is formed by the selected picture blocks of the temporally nearest preceding picture F(n−1) which are situated in the selected search area 108 being copied into the initialization mixed picture 109 and overwriting the coding information of the picture blocks of the initialization mixed picture at the corresponding position.

A motion estimation is then carried out (step 306) on the further mixed picture again with regard to the picture to be coded and a second motion vector and a second error value are formed, which are again stored (step 307).

In a checking step (step 308), a check is made to determine whether a termination criterion is satisfied.

The termination criterion in accordance with this exemplary embodiment is whether the error value or the second error value is less than a predetermined threshold value.

If neither the error value nor the second error value is less than the predetermined threshold value, then a third mixed picture is formed in the same way as the further mixed picture, iteratively by overwriting the selected picture blocks of the temporally third preceding picture, whose picture blocks are situated in the search area.

Generally, in each case, if a check is made to determine whether the termination criterion is satisfied and it emerges that the termination criterion is not satisfied, a mixed picture of a further iteration is formed by overwriting coding information of a temporally preceding mixed picture by coding information from picture blocks of a further preceding picture further back in time, whose picture blocks are situated in the search area, and in each case a motion estimation is again carried out on the mixed picture of the next iteration, as a result of which a motion vector of the respective next iteration and a further error value of the next iteration are formed and the checking step (step 308) is again applied, now in particular to the error value of the next iteration. If the termination criterion is satisfied, then the corresponding further motion vector formed and the specification of the iteration of the corresponding mixed picture in which this motion vector was determined are fed to the unit for run length coding 213.

Furthermore, the coding information of the corresponding selected picture area in the search area is fed as selected picture block for difference formation to the switch unit 207 (step 309).

If the predetermined memory area of the second memory 222 is full, then further coding information items of further, more up-to-date selected picture blocks, the run-length-coded motion vectors and the corresponding assignment information are likewise subjected to run length decoding (not illustrated) and stored in the first memory 220, thereby overwriting stored coding information items which have not been used the longest in the context of the motion estimation.

Figure 4:
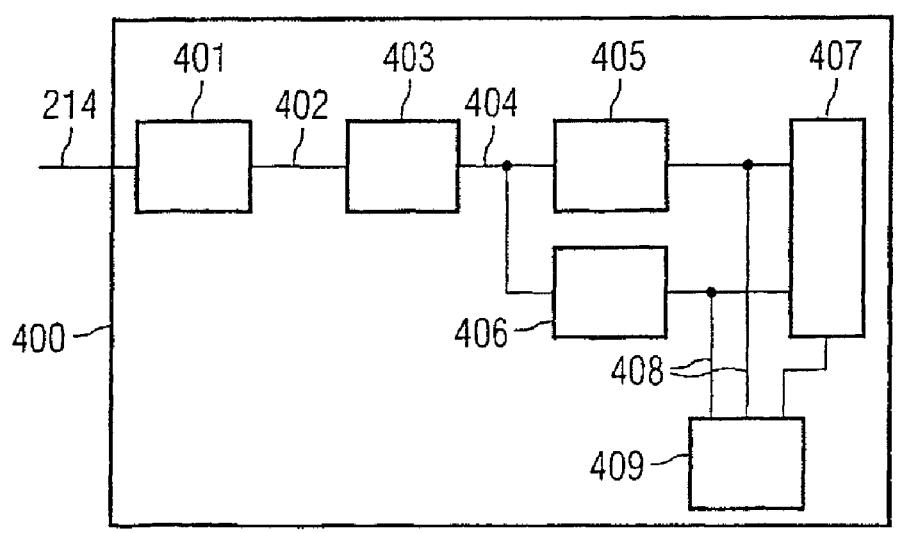
FIG. 4 shows a decoding arrangement in accordance with an exemplary embodiment of the present invention.

The run-length-coded motion vectors, mixed picture indices and the run-length-coded transform coefficients are received by a receiver, where they are fed to a unit for decoding 400 (cf FIG. 4).

The run-length-coded transform coefficients 214 are fed to a unit for the inverse quantization unit 401, whereby inverse-quantized transform coefficients 402 are formed.

The inverse-quantized transform coefficients 402 are fed to an inverse transformation unit 403 in which, by carrying out an inverse discrete cosine transform, inverse-transformed coefficients 404 are formed and are stored in a first memory 405.

Using the motion vectors determined and the reconstructed pictures in the context of decoding, the corresponding required mixed picture is, in each case, stored in a second memory 406.

In a unit for motion compensation 407, the corresponding motion vector and the mixed picture are used to effect a reconstruction of the required picture block, that is to say the coding information of the corresponding picture block, which is fed as difference information 408 to an addition unit 409 and added in accordance with the reconstructed difference coding information.

In this way, the reconstructed picture is generated by a sequence of reconstructed picture blocks.

A number of alternatives to the exemplary embodiment illustrated above are described below.

Various possibilities are provided for selecting the relevant picture blocks which are stored in the second memory 222. Thus, it is possible to select those picture blocks whose coding information has changed significantly compared with the corresponding picture block of the preceding picture; that is to say, whose coding information difference is greater than a predetermined second threshold value.

A further selection criterion may be that so-called intra-coded picture blocks are selected; that is to say, picture blocks whose coding information has been completely coded, and not just as difference picture blocks.

This procedure is suitable, in particular, for the case where the entire picture is not intra-coded, but rather only parts of the picture.

The present invention is likewise suitable for an error concealment; that is to say, for an error concealment in the coder device.

In this alternative embodiment, in accordance with the method illustrated in FIG. 3, the received picture is reconstructed with corresponding mixed pictures and, for an erroneous picture block for which the way in which it is to be decoded is not known, a corresponding picture block is selected from one of the mixed pictures of temporally preceding pictures and written to the corresponding erroneous picture area.

Furthermore, it is possible for the second memory to be preoccupied by typical picture patterns, which essentially equates to a vector quantization. What can be used as such picture patterns are, for example, areal, skin-colored picture blocks or else open or closed eyes, which clearly serve as a code book in the context of a vector quantization.

Although the present invention has been described with reference to specific embodiments, those of skill in the art will recognize that changes may be made thereto without departing from the spirit and scope of the present invention as set forth in the hereafter appended claims.

The following publication is cited in this document:
[1] ITU-T H.263+, Annex N

The invention claimed is:

1. A method for storing and processing picture information of temporally successive pictures, the method comprising the steps of:
    selecting picture areas within one of the pictures and at least one other preceding picture of the temporal succession, said picture areas being a portion of said picture and the at least one preceding picture;
    copying and storing the selected picture areas and picture information related to each selected picture area, wherein the picture information comprises an assignment information item that identifies the picture to which each picture area is assigned to, and further identifies the coordinate location of each picture area within a respectively assigned picture in the temporal succession;
    forming at least one mixed picture from the stored picture areas and picture information by processing each picture area according to the assignment information identified for the picture areas in the temporal succession; and
    using the mixed picture for one of a reference picture for a motion estimation, a reference picture for a motion compensation and an error concealment for a picture.

2. A method for storing and processing picture information of temporally successive pictures as claimed in claim 1, wherein a picture area is selected if the picture information in the corresponding picture area satisfies a predetermined criterion for motion estimation of two temporally successive pictures.

3. A method for storing and processing picture information of temporally successive pictures as claimed in claim 1, wherein picture areas are selected from a plurality of successive temporally preceding pictures and are stored.

4. A method for storing and processing picture information of temporally successive pictures as claimed in claim 1, wherein the picture information is stored in a ring memory structure.

5. A method for storing and processing picture information of temporally successive pictures as claimed in claim 1, the method further comprising the step of carrying out a motion estimation on the at least one mixed picture with regard to the picture.

6. A method for storing and processing picture information of temporally successive pictures as claimed in claim 1, the method further comprising the steps of:

forming a plurality of mixed pictures from the picture information from picture areas of a plurality of temporally preceding pictures;

carrying out, for each mixed picture, a motion estimation with regard to the picture;

selecting the mixed picture for which the motion estimation yields a best result with regard to a predetermined criterion;

forming motion vectors for the picture areas of the selected mixed picture.

7. A method for storing and processing picture information of temporally successive pictures as claimed in claim 6, wherein the mixed pictures are formed iteratively for each temporally preceding picture taken into account progressively proceeding from the picture for which further processing is provided.

8. A method for storing and processing picture information of temporally successive pictures as claimed in claim 6, wherein the mixed pictures are formed progressively via the steps of:

copying the stored picture information of a respective temporally preceding picture into a mixed picture;

storing the resulting mixed picture;

copying the stored picture information of a respective temporally further preceding picture into the mixed picture resulting in the preceding step; and progressively repeating the steps for each mixed picture to be formed until all the temporally preceding pictures have been taken into account.

9. A method for storing and processing picture information of temporally successive pictures as claimed in claim 1, wherein the picture area is at least one of a picture object of predeterminable form, a macroblock and a picture block.

10. A method for storing and processing picture information of temporally successive pictures as claimed in claim 1, wherein the method is used in one of video telephony, digital television, HDTV, Internet video streaming, video on demand, business television, and Internet television.

11. A method for storing and processing picture information of temporally successive pictures as claimed in claim 1, wherein at least one of the picture information from each selected picture area and the associated assignment information is compressed prior to storage.

12. A computer-readable storage medium, encoded with a computer program including executable instructions, for storing and processing picture information of temporally successive pictures, which, upon being executed by a processor, comprises the steps of:

selecting picture areas for each of at least two temporally preceding pictures;

copying and storing the selected picture areas, along with picture information of the selected picture areas with assignment information items related to each picture area, which enable an assignment of each respective picture area to the corresponding picture and to a position of the picture area within the picture by identifying the picture to which each picture area is assigned to, and further identifying the coordinate location of each picture area within a respectively assigned picture in the temporal succession;

forming at least one mixed picture from the stored picture areas and picture information, wherein the mixed picture is formed using the assignment information items; and using the mixed picture for one of a reference picture for a motion estimation, a reference picture for a motion compensation and an error concealment for a picture.

13. A computer-readable storage medium, encoded with a computer program including executable instructions, for storing and processing picture information of temporally successive pictures, upon being executed by a processor, comprises the steps of:

selecting picture areas within one of the pictures and at least one other preceding picture of the temporal succession, said picture areas being a portion of said picture and at least one preceding picture;

copying and storing the selected picture areas and picture information related to each selected picture area, wherein the picture information comprises an assignment information item that identifies the picture to which each picture area is assigned to, and further identifies the coordinate location of each picture area within a respectively assigned picture in the temporal succession;

forming at least one mixed picture from the stored picture areas and picture information by processing each picture area according to the assignment information identified for each picture area in the temporal succession; and using the mixed picture for one of a reference picture for a motion estimation, a reference picture for a motion compensation and an error concealment for a picture.

14. An apparatus for storing and processing picture information of temporally successive pictures, comprising:

a processor;

means for selecting picture areas within one of the pictures and at least one other preceding picture of the temporal succession, said picture areas being a portion of said picture and at least one preceding picture;

means for copying and storing the selected picture areas and picture information related to each selected picture area, wherein the picture information comprises an assignment information item that identifies the picture to which each picture area is assigned to, and further identifies the coordinate location of each picture area within a respectively assigned picture in the temporal succession;

means for forming at least one mixed picture from the stored picture areas and picture information by processing each picture area according to the assignment information identified for each picture area in the temporal succession; and means for using the mixed picture for one of a reference picture for a motion estimation, a reference picture for a motion compensation and an error concealment for a picture.

* * * * *